US008908319B1

(12) United States Patent
Gustafson et al.

(10) Patent No.: US 8,908,319 B1
(45) Date of Patent: Dec. 9, 2014

(54) DISK DRIVE WITH SLOW ACTING DESICCANT

(71) Applicant: Western Digital Technologies, Inc., Irvine, CA (US)

(72) Inventors: John R. Gustafson, Los Gatos, CA (US); Mukesh Patel, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/900,085

(22) Filed: May 22, 2013

Related U.S. Application Data

(60) Provisional application No. 61/813,458, filed on Apr. 18, 2013.

(51) Int. Cl.
*G11B 33/14* (2006.01)

(52) U.S. Cl.
CPC .................................. *G11B 33/1453* (2013.01)
USPC ...................................... 360/97.16; 55/385.6

(58) Field of Classification Search
USPC ............................. 360/97.12, 97.16; 55/385.6
See application file for complete search history.

(56) References Cited

U.S. PATENT DOCUMENTS

| 4,642,715 | A | 2/1987 | Ende |
| 4,831,475 | A | 5/1989 | Kakuda et al. |
| 4,863,499 | A | 9/1989 | Osendorf |
| 5,075,807 | A | 12/1991 | Inoue et al. |
| 5,229,899 | A * | 7/1993 | Brown et al. ............. 360/97.18 |
| 5,235,482 | A | 8/1993 | Schmitz |
| 5,392,177 | A | 2/1995 | Chainer et al. |
| 5,734,521 | A | 3/1998 | Fukudome et al. |
| 6,046,889 | A | 4/2000 | Berding et al. |
| 6,052,890 | A | 4/2000 | Malagrino, Jr. et al. |
| 6,061,206 | A | 5/2000 | Foisy et al. |
| 6,101,876 | A | 8/2000 | Brooks et al. |
| 6,128,159 | A | 10/2000 | Ino |
| 6,147,831 | A | 11/2000 | Kennedy et al. |
| 6,151,189 | A | 11/2000 | Brooks |
| 6,151,197 | A | 11/2000 | Larson et al. |
| 6,185,067 | B1 | 2/2001 | Chamberlain |
| 6,185,074 | B1 | 2/2001 | Wang et al. |
| 6,208,484 | B1 * | 3/2001 | Voights ..................... 360/99.13 |
| 6,208,486 | B1 | 3/2001 | Gustafson et al. |
| 6,215,616 | B1 | 4/2001 | Phan et al. |
| 6,238,467 | B1 * | 5/2001 | Azarian et al. .................. 96/135 |
| 6,288,866 | B1 | 9/2001 | Butler et al. |
| 6,292,333 | B1 | 9/2001 | Blumentritt et al. |
| 6,344,950 | B1 | 2/2002 | Watson et al. |

(Continued)

FOREIGN PATENT DOCUMENTS

CN 200910138059 7/2013

OTHER PUBLICATIONS

John R. Gustafson, et. al., U.S. Appl. No. 13/786,374, filed Mar. 5, 2013, 14 pages.

*Primary Examiner* — Angel Castro

(57) ABSTRACT

A disk drive includes a disk drive enclosure and a disk rotatably mounted to and within the disk drive enclosure. A desiccant canister is in fluid communication with the disk drive enclosure. The desiccant canister includes a canister housing and a desiccant material within the canister housing. The desiccant canister includes a water absorption restriction that limits a steady-state hourly water absorption rate of the desiccant to not exceed 2% of the desiccant's total capacity for water absorption.

23 Claims, 3 Drawing Sheets

(56) References Cited

U.S. PATENT DOCUMENTS

| | | |
|---|---|---|
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 * | 9/2003 | Watkins et al. ............ 360/97.18 |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,687 B2 | 9/2005 | Hong et al. |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,082,012 B2 * | 7/2006 | Macpherson et al. ..... 360/97.18 |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,166,142 B2 * | 1/2007 | Tuma et al. ................ 55/385.6 |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |

(56) References Cited

U.S. PATENT DOCUMENTS

| | | | |
|---|---|---|---|
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,291,208 B2 | 11/2007 | Dauber et al. |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,466,514 B2 * | 12/2008 | Brown et al. ............... 360/97.16 |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,486,474 B2 * | 2/2009 | Shin et al. .................. 360/97.18 |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,686,871 B2 * | 3/2010 | Oh et al. ........................ 96/134 |
| 7,688,543 B2 * | 3/2010 | Lee et al. .................... 360/97.12 |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,238,054 B2 | 8/2012 | Kim et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 2003/0142438 A1 | 7/2003 | Brown et al. |
| 2005/0036232 A1 | 2/2005 | Macpherson |
| 2005/0063093 A1 | 3/2005 | Hong et al. |
| 2009/0116141 A1 | 5/2009 | Brown |
| 2011/0109989 A1 | 5/2011 | Turner et al. |
| 2011/0212281 A1 | 9/2011 | Jacoby et al. |
| 2012/0039000 A1 * | 2/2012 | Brown ....................... 360/97.02 |
| 2012/0275053 A1 | 11/2012 | McGuire, Jr. |
| 2013/0038964 A1 | 2/2013 | Garbarino et al. |

(56) References Cited

U.S. PATENT DOCUMENTS

| | | |
|---|---|---|
| 2013/0044391 A1 | 2/2013 | Brown |
| 2013/0044392 A1 | 2/2013 | Brown |
| 2013/0044393 A1 | 2/2013 | Brown et al. |
| 2013/0091698 A1 | 4/2013 | Banshak, Jr. et al. |
| 2013/0148239 A1 | 6/2013 | Lee |
| 2013/0155546 A1 | 6/2013 | Heo et al. |
| 2013/0290988 A1 | 10/2013 | Watson et al. |

\* cited by examiner

DISK DRIVE WITH SLOW ACTING DESICCANT

CROSS-REFERENCE TO RELATED APPLICATIONS

This application claims priority to provisional U.S. Patent Application Ser. No. 61/813,458, filed on Apr. 18, 2013, which is hereby incorporated by reference in its entirety.

BACKGROUND

Information storage devices are used to retrieve and/or store data in computers and other consumer electronics devices. A magnetic hard disk drive is an example of an information storage device that includes one or more heads that can both read and write to a spinning disk media, but other information storage devices also include heads—sometimes including heads that cannot write.

Disk drives may be hermetically sealed, for example so that an alternative gas (e.g. helium) can be retained within the disk drive. In such hermetically sealed disk drives, humidity that enters during manufacture may be trapped inside thereafter. Such humidity may condense at reduced temperatures, causing undesired water particles or droplet within the disk drive. Even in non-hermetically sealed disk drives, the disk drive reliability may be enhanced by control of humidity within the disk drive enclosure, since such humidity may otherwise adversely affect the head/disk interface. For example, disk drives have been manufactured with internal desiccant materials within, to reduce the accumulation of moisture and the risk of water particles or droplets reaching the head/disk interface.

However, during disk drive manufacture, there is often a period after installation of a desiccant material into the disk drive, but before finally sealing the disk drive enclosure. During that period, the desiccant material may be degraded by humidity in the manufacturing environment (e.g. clean room moisture absorption by the desiccant). Hence there is a need in the art for a means to preserve a desiccant material for a longer period during the disk drive manufacturing process.

DETAILED DESCRIPTION OF EXEMPLARY EMBODIMENTS

Figure 1:
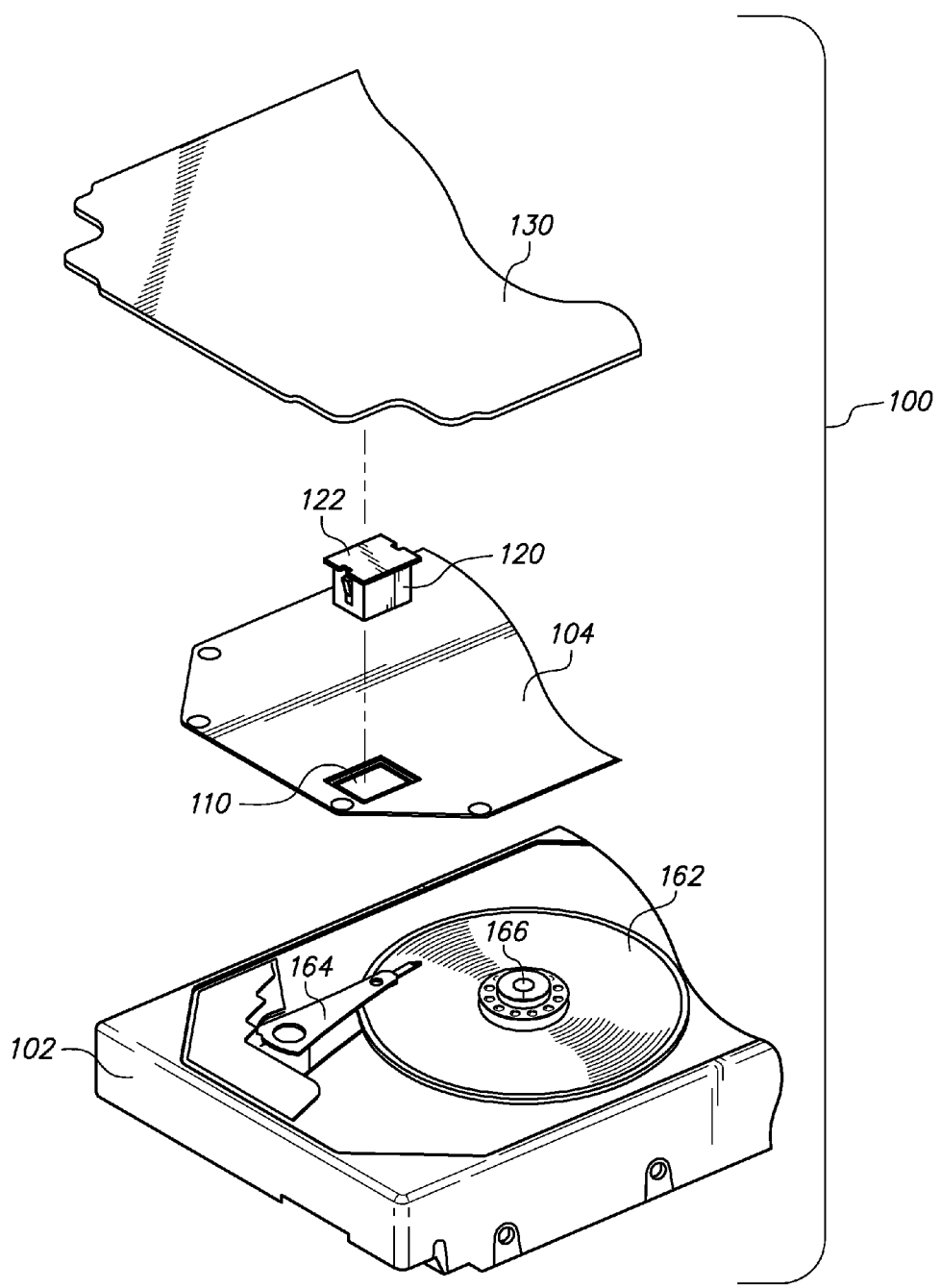
FIG. 1 is a top perspective exploded view of a disk drive capable of including an embodiment of the present invention.

FIG. 1 is top perspective exploded view of a disk drive 100 according to an embodiment of the present invention. The disk drive 100 includes a disk drive base 102 and a disk drive cover 104 that together comprise a disk drive enclosure. The disk drive 100 further includes a spindle 166, rotatably mounted on the disk drive base 102, for rotating at least one disk 162 that is mounted on the spindle 166. In certain embodiments, disk drive 100 may have only a single disk 162, or alternatively, two or more disks. The disk drive 100 also includes a head stack assembly 164 pivotably mounted to the disk drive base 102 for positioning one or more read or write heads over a respective surface of the disk 162.

In the embodiment of FIG. 1, the disk drive cover 104 includes a canister opening 110, although in an alternative embodiment the canister opening may instead be disposed in the disk drive base 102. The disk drive 100 includes a desiccant canister 120 (e.g. a canister formed from a hard plastic material) containing a desiccant material such as silica gel, activated carbon, calcium sulfate, calcium chloride, and/or montmorillonite clay. FIG. 1 shows that after assembly the desiccant canister 120 is at least partially disposed within the disk drive enclosure 102, 104.

The desiccant canister 120 may include internal and/or external features described herein so that the rate of water vapor absorption (relative to the desiccant's total capacity for water absorption) is slowed. For example, in certain embodiments, the desiccant canister 120 includes a water absorption restriction that limits a steady-state hourly water absorption rate of the desiccant to not exceed 2% of the total capacity for water absorption of the desiccant material within. In this context, the steady-state hourly water absorption rate may be consistently estimated or measured after any initially high transient water absorption rate has passed, in an environment in which the relative humidity is held at approximately 80%.

In certain embodiments where freedom from temporal limitations in the manufacturing process is even more important, the water absorption restriction may preferably but not necessarily limit the maximum steady-state hourly water absorption rate of the desiccant to not exceed 0.20% of the total capacity for water absorption of the desiccant material. Note also that the scientific definition of water (i.e. $H_2O$) is contemplated herein, according to which "water" need not be in liquid form. For example, $H_2O$ vapor in humid air is considered "water" herein.

In the embodiment of FIG. 1, a hermetic seal 130 covers the external surface 122 of the desiccant canister 120, and is externally adhered to the cover 104 of the disk drive enclosure. In the embodiment of FIG. 1, the hermetic seal 130 optionally is a disk drive cover seal that is also adhered to the external surface 122 of the desiccant canister 120, and may optionally also be adhered to an external surface of the disk drive base 102. In certain embodiments, the hermetic seal 130 preferably includes a metal foil laminated with an adhesive layer.

In certain embodiments, the rate of water vapor absorption by the desiccant in the canister 120 is slowed by a diffusion hole in the canister 120 that faces into the disk drive enclosure 102, 104 (and is in fluid communication with the disk drive enclosure 102, 104). In certain other embodiments, the rate of water vapor absorption by the desiccant in the desiccant canister 120 is slowed by a barrier to the desiccant—e.g. a pressure sensitive adhesive (PSA) polymer layer, with a finite clearance between its periphery and an interior surface of an opening in the canister, to allow diffusion around the barrier. The barrier may also be a semi-permeable polymer membrane or carbon layer that does not need such a peripheral clearance to permit diffusion around it or therethrough.

Figure 2:
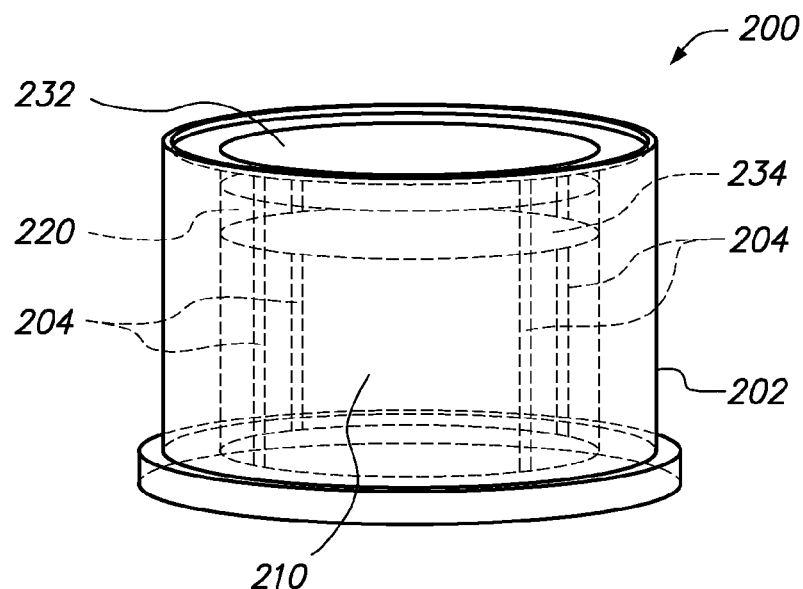
FIG. 2 is a side perspective view of a desiccant canister according to an embodiment of the present invention.

FIG. 2 is a side perspective view of a desiccant canister 200 according to an embodiment of the present invention. In the embodiment of FIG. 2, the desiccant canister 200 includes a canister housing 202, and a desiccant material 210 within the canister housing 202. The desiccant material 210 defines a total capacity for water absorption. The desiccant canister 200 also includes a plurality of diffusion paths 204 that permit but limit a steady-state hourly water absorption rate of the desiccant material 210. The diffusion paths 204 do this by allowing limited diffusion from the outside environment past a barrier 234 (e.g. a pressure sensitive adhesive polymer layer) within an opening in the canister housing 202 that faces into the disk drive enclosure.

Specifically, in the embodiment of FIG. 2, the diffusion paths 204 create local regions of increased finite clearance between the outer periphery of the barrier 234 and an interior surface (within the opening) of the canister housing 202 to allow and limit diffusion from the external environment around the barrier 234. In certain embodiments, the diffusion paths 204 (in conjunction with the barrier 234) preferably limit the diffusion such that the steady-state hourly water absorption rate of the desiccant material 210 does not exceed 2% of the total capacity for water absorption of the desiccant material 210. In the embodiment of FIG. 2, the desiccant canister 200 also includes an optional adsorbant layer 220 (e.g. carbon), and includes an optional gas-permeable membrane 232 over the opening in the canister housing 202 that faces into the disk drive enclosure. For example, an expanded polytetrafluoroethylene (EPTFE) filter fabric may be used as the gas-permeable membrane.

Figure 3:
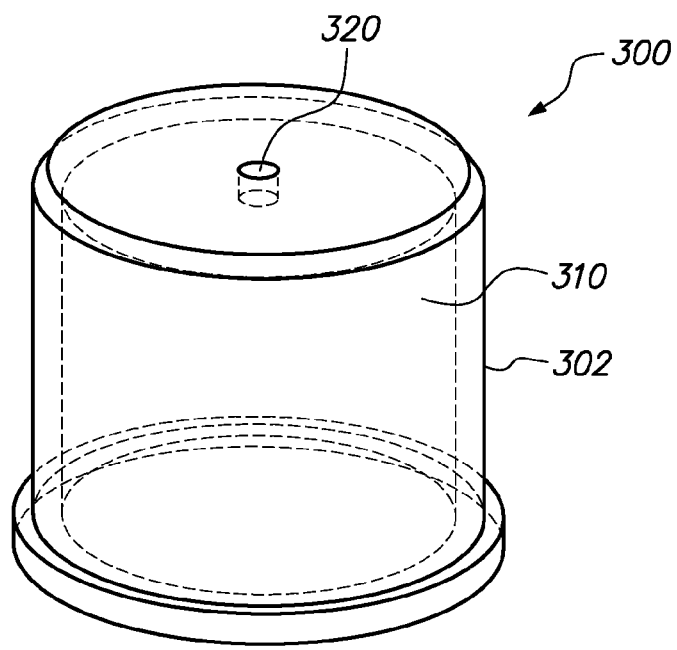
FIG. 3 is a top perspective view of a desiccant canister according to an embodiment of the present invention.

FIG. 3 is a top perspective view of a desiccant canister 300 according to an embodiment of the present invention. In the embodiment of FIG. 3, the desiccant canister 300 includes a canister housing 302, and a desiccant material 310 within the canister housing 302. The desiccant material 310 defines a total capacity for water absorption.

In the embodiment of FIG. 3, the canister housing 302 includes an opening 320 therethrough, which acts as a water absorption restriction. The opening 320 preferably faces into the disk drive enclosure, so that the desiccant canister 300 is in fluid communication with the disk drive enclosure. In the embodiment of FIG. 3, the opening 320 is optionally cylindrical, with a diameter that is preferably but not necessarily in the range of 0.25 mm to 2 mm. In certain embodiments, the opening 320 preferably limits diffusion therethrough, such that the steady-state hourly water absorption rate of the desiccant material 310 does not exceed 2% of the total capacity for water absorption of the desiccant material 310.

Figure 4:
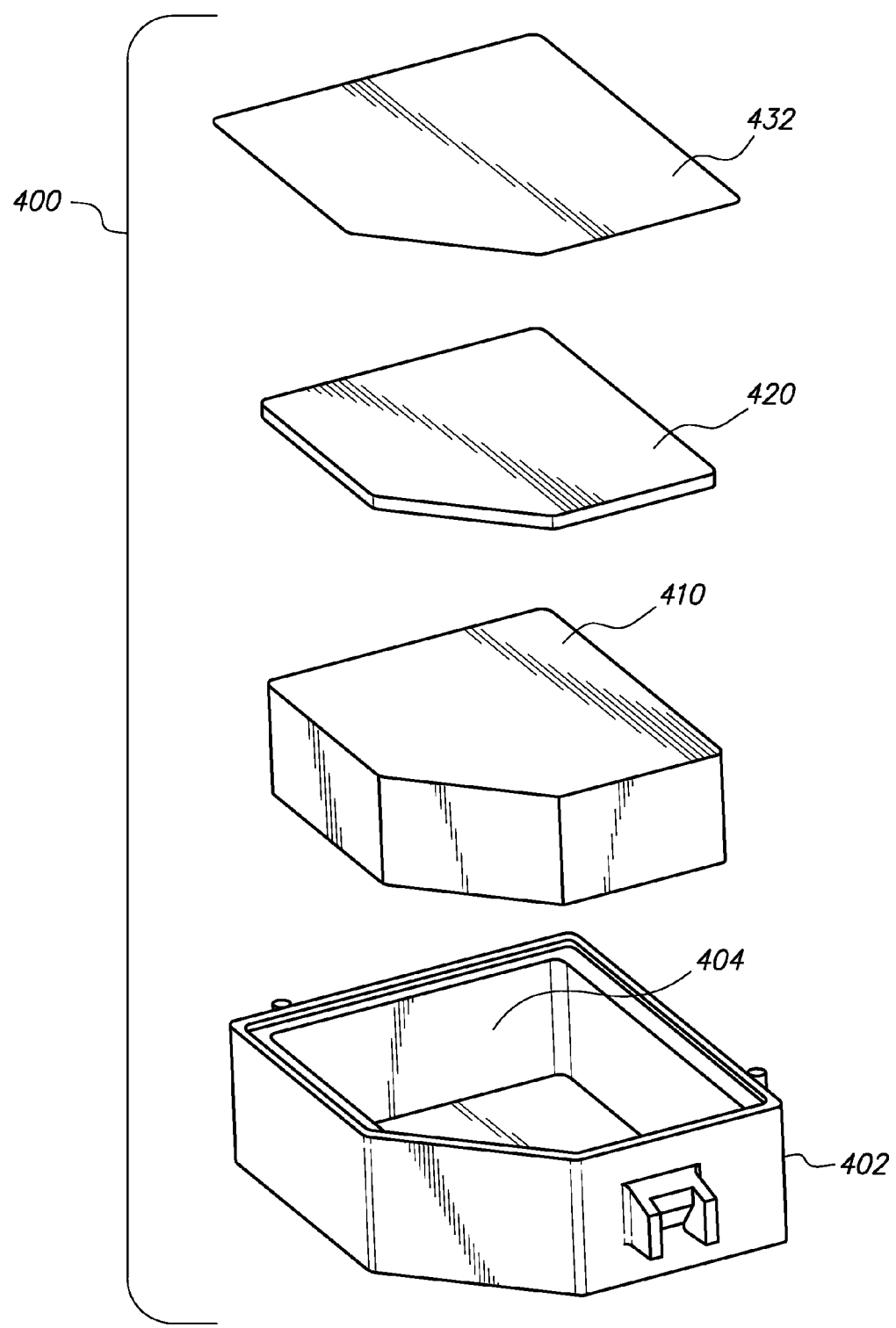
FIG. 4 is a top exploded perspective view of a desiccant canister according to an embodiment of the present invention.

FIG. 4 is a top exploded perspective view of a desiccant canister 400 according to an embodiment of the present invention. In the embodiment of FIG. 4, the desiccant canister 400 includes a canister housing 402, and a desiccant material 410 within the canister housing 402. In certain embodiments, the canister housing 402 may comprise a hard plastic material that preferably but not necessarily has a thickness in the range of 0.5 mm to 5 mm. In the embodiment of FIG. 4, the canister housing 402 includes an opening 404 that faces into the disk drive enclosure, so that the canister 400 is in fluid communication with the disk drive enclosure.

In the embodiment of FIG. 4, the desiccant material 410 comprises a solid monolith of desiccant material 410, which may be coated by a semi-permeable barrier layer that permits but limits a steady-state hourly water absorption rate of the desiccant material 410. For example, the semi-permeable barrier layer may be a semi-permeable polymer film or a latex paint having a thickness in the range of 10 microns to 100 microns.

In the embodiment of FIG. 4, the semi-permeable barrier layer on the desiccant material 410 serves as a water absorption restriction, limiting the water diffusion therethrough, such that the steady-state hourly water absorption rate of the desiccant material 410 does not exceed 2% of the total capacity for water absorption of the desiccant material 410. In the embodiment of FIG. 4, the desiccant canister 400 also includes an optional adsorbant layer 420 (e.g. carbon), and includes and an optional gas-permeable membrane 432 over the opening 404 in the canister housing 402. For example, an expanded polytetrafluoroethylene (EPTFE) filter fabric may be used as the gas-permeable membrane. In alternative embodiment, the desiccant material 410 may not need to be coated with a semi-permeable polymer film or a latex paint, because the optional adsorbant layer 420 may also serve as the water absorption restriction. In such an embodiment, if the optional adsorbant layer comprises activated carbon, it may have a thickness that is preferably in the range 0.3 mm to 2 mm.

In various embodiments described herein, water vapor absorption by the desiccant cartridge is advantageously limited to a substantial and non-zero but reduced rate, so that the desiccant cartridge can be exposed to a normal external manufacturing environment without becoming saturated for a practical period during disk drive assembly, yet thereafter still absorb moisture from the internal environment of the assembled disk drive quickly enough to control the humidity within the disk drive (e.g. during the useful life of the assembled disk drive).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive enclosure;
   a disk rotatably mounted to and within the disk drive enclosure; and
   a desiccant canister in fluid communication with the disk drive enclosure, the desiccant canister including:
      a canister housing;
      a desiccant material within the canister housing, the desiccant material defining a total capacity for water absorption, and
      a water absorption restriction that limits a steady-state hourly water absorption rate of the desiccant material to not exceed 2% of the desiccant material's total capacity for water absorption.

2. The disk drive of claim 1 wherein the desiccant canister is in fluid communication with the disk drive enclosure by the canister housing including an opening that faces into the disk drive enclosure.

3. The disk drive of claim 2 wherein the canister housing is at least partially disposed within the disk drive enclosure.

4. The disk drive of claim 2 wherein the opening in the canister housing is the water absorption restriction.

5. The disk drive of claim 4 wherein the opening is cylindrical with a diameter in the range of 0.25 mm to 2 mm.

6. The disk drive of claim 2 wherein the water absorption restriction comprises a pressure sensitive adhesive (PSA) polymer layer that has an outer periphery and that is disposed within the opening in the canister housing, the outer periphery of the PSA polymer layer being disposed with a finite clearance from the opening in the canister housing, said clearance allowing water absorption between the PSA polymer layer and the opening in the canister housing.

7. The disk drive of claim 1 wherein the canister housing comprises a hard plastic material having a thickness in the range of 0.5 mm to 5 mm.

8. The disk drive of claim 1 wherein the water absorption restriction comprises a semi-permeable barrier layer.

9. The disk drive of claim 8 wherein the semi-permeable barrier layer comprises a semi-permeable activated carbon layer having a thickness in the range of 0.3 mm to 2 mm.

10. The disk drive of claim 8 wherein the desiccant material comprises a solid monolith of desiccant material, and the semi-permeable barrier layer is a coating on the solid monolith of desiccant material.

11. The disk drive of claim 10 wherein the coating comprises a semi-permeable polymer film or a latex paint, having a thickness in the range of 10 microns to 100 microns.

12. The disk drive of claim 1 wherein the steady-state hourly water absorption rate of the desiccant material does not exceed 0.20% of the desiccant material's total capacity for water absorption.

13. A desiccant canister for a disk drive, the desiccant canister comprising:
a canister housing;
a desiccant material within the canister housing, the desiccant material defining a total capacity for water absorption, and
a water absorption restriction that limits a steady-state hourly water absorption rate of the desiccant material to not exceed 2% of the desiccant material's total capacity for water absorption.

14. The desiccant canister of claim 13 wherein the desiccant canister includes an opening for water absorption.

15. The desiccant canister of claim 14 wherein the opening in the canister housing is the water absorption restriction.

16. The desiccant canister of claim 15 wherein the opening is cylindrical with a diameter in the range of 0.25 mm to 2 mm.

17. The desiccant canister of claim 14 wherein the water absorption restriction comprises a pressure sensitive adhesive (PSA) polymer layer that has an outer periphery and that is disposed within the opening in the canister housing, the outer periphery of the PSA polymer layer being disposed with a finite clearance from the opening in the canister housing, said clearance allowing water absorption between the PSA polymer layer and the opening in the canister housing.

18. The desiccant canister of claim 13 wherein the canister housing comprises a hard plastic material having a thickness in the range of 0.5 mm to 5 mm.

19. The desiccant canister of claim 13 wherein the steady-state hourly water absorption rate of the desiccant material does not exceed 0.20% of the desiccant material's total capacity for water absorption.

20. The desiccant canister of claim 13 wherein the water absorption restriction comprises a semi-permeable barrier layer.

21. The desiccant canister of claim 20 wherein the semi-permeable barrier layer comprises a semi-permeable activated carbon layer having a thickness in the range of 0.3 mm to 2 mm.

22. The desiccant canister of claim 20 wherein the desiccant material comprises a solid monolith of desiccant material, and the semi-permeable barrier layer is a coating on the solid monolith of desiccant material.

23. The desiccant canister of claim 22 wherein the coating comprises a semi-permeable polymer film or a latex paint, having a thickness in the range of 10 microns to 100 microns.

\* \* \* \* \*